June 28, 1932.　　　G. F. STARBUCK　　　1,865,220

RAILROAD TRUCK

Filed March 14, 1930　　　3 Sheets-Sheet 1

Inventor:
George F. Starbuck.

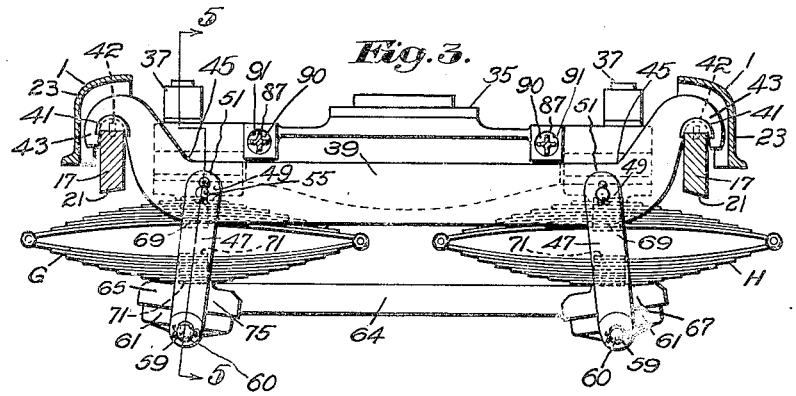

June 28, 1932. G. F. STARBUCK 1,865,220
RAILROAD TRUCK
Filed March 14, 1930 3 Sheets-Sheet 3
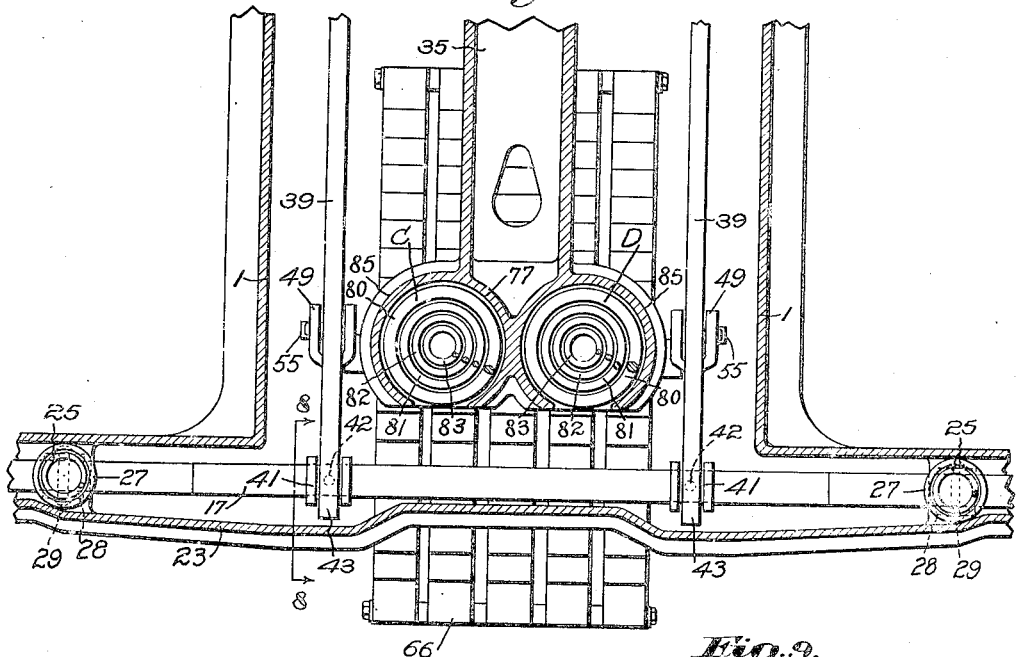
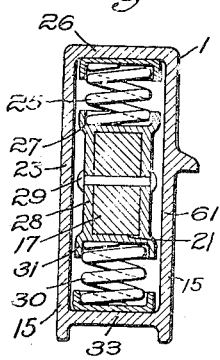
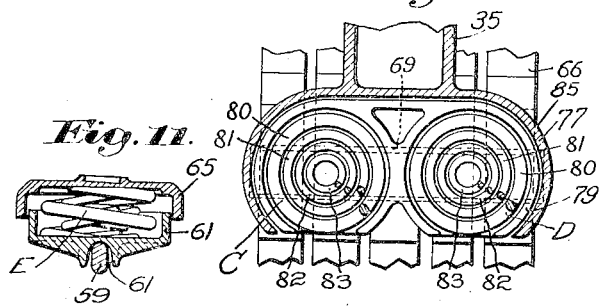
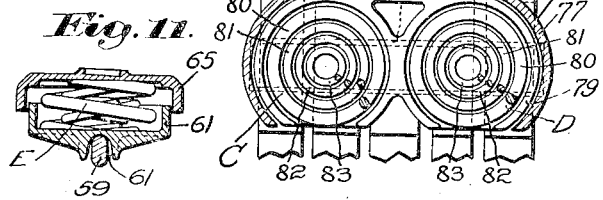
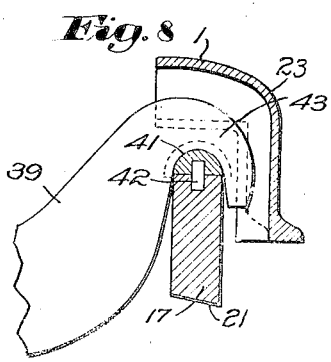
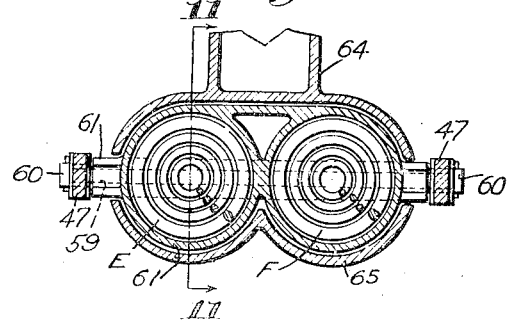

Patented June 28, 1932

1,865,220

UNITED STATES PATENT OFFICE

GEORGE F. STARBUCK, OF WALTHAM, MASSACHUSETTS

RAILROAD TRUCK

Application filed March 14, 1930. Serial No. 435,811.

My invention aims to provide an improved, strong and light railroad truck embodying a maximum of flexibility and the elimination of undue wear, shocks and rattles of moving parts or, in other words, improved riding qualities.

In the accompanying drawings is shown an illustrative embodiment of the invention, wherein:

Fig. 3 is a detail vertical section of the truck taken on line 3—3 of Fig. 1 looking in the direction of the arrows in said figure;

Fig. 4 is a detail longitudinal section on line 4—4 of Fig. 1;

Fig. 5 is a detail section taken on the irregular line 5—5 of Fig. 3;

Fig. 6 is a partial plan section of one side portion of the truck showing the resilient supporting members and cooperating equalizing devices taken approximately on line 6—6 of Fig. 2;

Fig. 7 is a detail vertical section on line 7—7 of Fig. 2;

Fig. 8 is a detail vertical section on line 8—8 of Fig. 6 through interengaging portions of the longitudinal and transverse equalizing members;

Fig. 9 is a horizontal section through the resilient supporting means taken on line 9—9 of Fig. 5;

Fig. 10 is a horizontal section on line 10—10 of Fig. 5; and

Fig. 11 is a detail vertical section on line 11—11 of Fig. 10.

Figure 1:
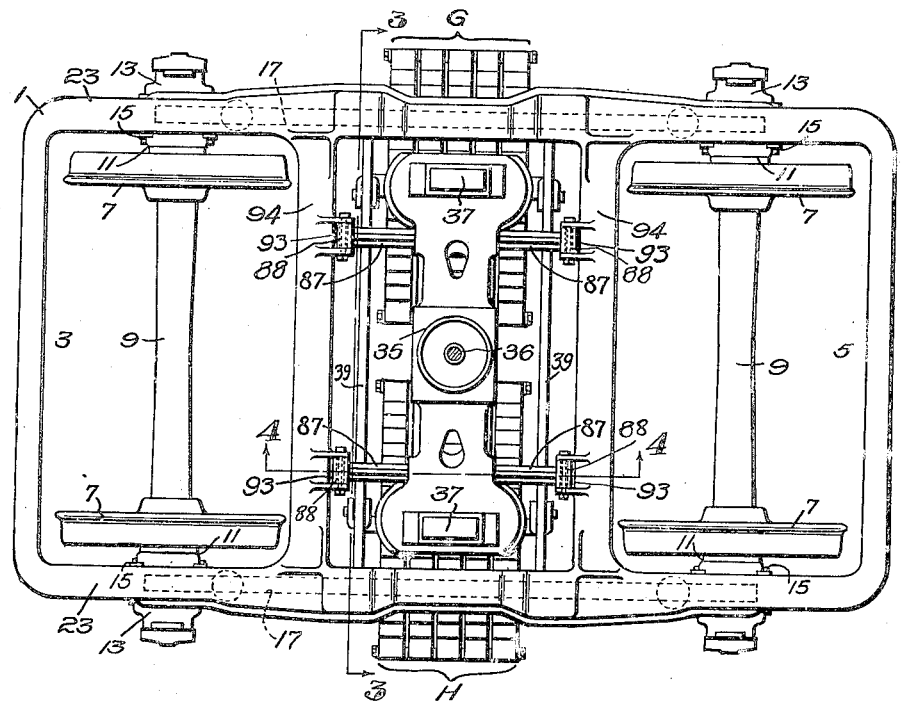
Fig. 1 is a plan view of the truck.

In the particular embodiment of my invention selected for purposes of illustration and shown in the drawings, I provide a railroad truck especially adapted for use in passenger train service, although the invention is not limited to this type of truck.

The particular example of truck chosen for illustration includes a truck frame 1 of generally rectangular form in plan and provided with openings 3 and 5 for the reception of the wheel elements 7, particularly when two pairs of wheels are employed, but it is to be understood that the invention is not limited to two pairs of wheels.

The car wheels 7 are arranged in pairs upon car axles 9 having journals 11 extending beyond the wheels in the usual manner for engagement with the car journal bearings, herein enclosed in journal boxes 13. The journal boxes 13 slide in and are guided vertically in guide members 15 formed upon the truck frames 1, said guide members cooperating with said journal boxes to maintain the car axles and wheels in proper longitudinal and transverse relations during their vertical relative movements as they roll along the tracks over which the trucks are propelled.

Mounted upon the journal boxes at opposite sides of the truck frame are equalizer members 17 which extend longitudinally of said truck frame from one journal box to the next, opposite end portions of each equalizer being supported upon suitable positioning surfaces 19 of the journal boxes 13. The equalizers 17 are herein so constructed that the under edge 21 of each longitudinal equalizer extends in approximately a straight line from one supporting surface 19 to the other, thus maintaining the equalizers 17 well above the journal box so as to provide ample clearance therebelow for the laterally projecting springs carrying the truck bolster, hereinafter more fully described.

The equalizers 17 are herein positioned approximately central of the journal boxes within the hollow side members 23 of the truck frame 1, which side members are made hollow to eliminate weight as well as to enclose said equalizers 17.

The truck frame 1, contrary to the usual custom of constructing railroad trucks, does not carry the resilient supporting means or springs of the car body or bolster but is left practically free to chatter and vibrate upon the journal boxes. Its principal function is to maintain the car journals and journal boxes in proper relation during the operations of the truck and to serve as a support for the brake rigging (not shown), and an incident of this arrangement is that if the truck is in a state of rest the truck frame 1 could be entirely removed without disturbing the car body or bolster, which latter would remain supported upon its entire set of springs directly from the journal boxes.

Figure 2:
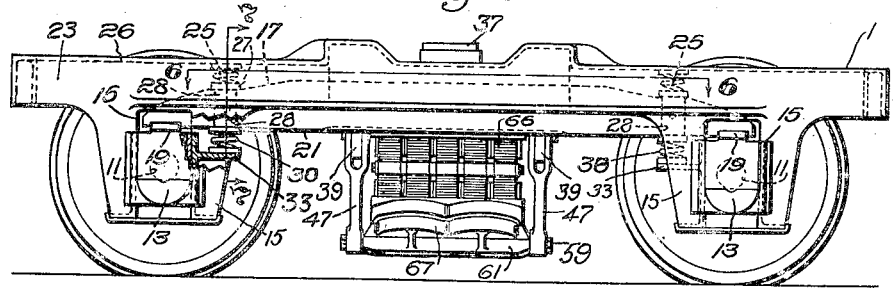
Fig. 2 is a side elevation of the same with parts broken away more clearly to illustrate normally concealed parts of the invention.

To avoid unnecessary shocks and clatter upon the truck frame and brake mechanism the truck frame is desirably resiliently supported upon the car journals, herein through the medium of the longitudinal equalizers 17 arranged desirably along opposite sides of the truck frame. This result is effected by interposing preferably a helical spring 25 at suitable points between upper flanges 26 of the truck frame 1 and spring seats 27, herein carried by straps 28 riveted at 29 to end portions of the equalizer 17 (see Figs. 2 and 7).

A second spring 30, similar to the spring 25, is interposed between a lower seat 31 also carried by said strap 28, and a foot 33 carried upon a part of the truck frame 1. A similar set of supporting springs is provided near each journal bearing of the truck, although the invention is not limited to the particular locations herein shown.

A bolster 35 of usual construction is placed upon the truck between each adjacent pair of axles 9, said bolster being arranged to receive the usual king pin 36 carried by the car body, and having side bearings 37 to prevent tipping of the car body on said bolster.

The load resting upon or carried by the bolster 35 is, in the present case, resiliently suspended upon the car journals independent of the truck frame and thereby eliminates a large portion of the weight contained in the truck frame, and by eliminating this extra weight there will be less tendency of vibration being set up in the resilient supporting means.

One method of producing the aforesaid desirable result may be seen, for example in Figs. 3, 4 and 8, and includes transverse equalizers 39 of which there are two shown, although the invention is not limited to this number. These transverse equalizers 39 are arranged in spaced parallel relation transversely of the truck and are supported at their opposite ends by the longitudinal equalizers 17. The present equalizing system is composed of the two longitudinal equalizers 17 and two transverse equalizers 39 which are flexibly connected, herein by semi-cylindrical saddle members 41 pinned to the upper edges of said equalizers 17 at 42 and upon which the end portions 43, having correspondingly shaped engaging surfaces, may be hooked over the semi-cylindrical saddles and permit a limited swinging movement of one equalizer member relatively to another.

The intermediate portions of the equalizers 39 are depressed, as shown at 45, Fig. 3, to provide supports from which the resilient members or springs may be hung low and thereby maintain a low center of gravity in the truck. To this end there is suspended near each end of each transverse equalizer a link 47 having a forked upper end 49 straddling the transverse equalizer adjacent thereto at a point 51, see Fig. 5, and at which they are pivoted by pins 55.

The swinging links 47, of which there are four provided for each truck, are each pivoted at their lower ends upon shafts 59. These shafts are mounted adjacent opposite sides of the truck to rock respectively in elongated spring seats 61, respectively carrying a group of springs 66 desirably of elliptic form.

The elongated spring seats 61, herein referred to as lower seats, are held in predetermined transverse spaced relation by a spring plank 64 provided near its opposite ends with upper spring seats 65 and 67, said spring plank 64 holding said spring seats at predetermined positions relatively to the pivot ends 60 of the shafts 59, also at different angles relatively to each other. Suspended, herein between the swinging links 47, are elliptic springs 66, comprising twin series G and H (see Figs. 1 and 3), for example arranged in groups of five with their long diameters extending transversely of the truck. Spring bands 69 and 71 secure together the upper and lower leaves of which said springs are composed (see Figs. 3 and 5).

To improve the riding qualities of the vehicle I provide in addition to said elliptic springs, other sets, herein of nested helical springs, preferably arranged in two groups C and D at opposite sides of the truck and in substantial supporting alignment with said elliptic springs 66. The groups C and D are what may be termed bolster springs because they support the part 77 and are in turn supported by the part 79 of the bolster 35. Each group C and D of helical springs is preferably composed of a plurality, for example four, separate springs 80, 81, 82 and 83, which, although nested in concentric relation, are nevertheless independent of each other and thereby permit use of a number of springs of relatively small wire, and by using these springs of relatively small wire, they will individually possess much greater flexibility and freedom of movement. The several individual spring elements composing the groups C and D are desirably enclosed in circular telescoping housings 85, herein cast into the bolster 35 (see Figs. 5, 6 and 9).

To provide greater clearance below the outer ends of the elliptic springs, and to reduce torsion stresses in the spring plank 64, I herein provide twin sets of helical springs E and F beneath the elliptic springs 66, which are likewise composed of nested springs of varying diameters and sizes of wire to correspond with the groups C and D, the groups E and F being arranged between the spring seat 61 and the part 65 of the spring plank 64.

With the truck frame 1 so constructed that it does not assist in carrying the springs for resiliently supporting the car body upon the truck and the truck frame takes no part in assisting in positioning the bolster 35 relatively to the car wheels, other means are required for this purpose, particularly in connection with the positioning of said bolster longitudinally of the truck.

To this end I provide universally movable struts 87 of which there are four shown herein in fore and aft relation, see particularly Figs. 1, 3 and 4, although the invention is not limited to this number. Each of these struts 87 is provided, for example, with spherical ends 89 and 90. The ends 90 are directed toward the bolster 35 and rest in spherical sockets 91 in opposed walls of said bolster. The opposite ends 89 of the struts 87 extend outwardly in opposite directions from said bolster 35 and are arranged in similar sockets 92, which latter are removably secured in recesses 93 formed in cross pieces 94 in said truck frame 1. The socket members 88 are secured in said cross pieces by pins 95 with provision for movement of said members 88 longitudinally of the struts 87, and inserted between said cross pieces 94 and the members 88 are shims 96 which may be replaced when desired by thicker or additional shims to compensate for wear in the pivotal ends of said struts.

The invention is not limited to the particular embodiment shown.

Claims:

1. In a railroad truck, journal boxes, longitudinal equalizers carried by said journal boxes, at least one pair of transverse beams each beam independently and pivotally carried by said longitudinal equalizers, and load-carrying means interposed between said transverse beams and the load.

2. In a railroad truck, journal boxes, longitudinal equalizers each supported near each end by a journal box, transverse beams pivotally supported by said equalizers, and resilient load-carrying means carried by said beams.

3. A railroad truck comprising journal boxes, longitudinal equalizers supported by said journal boxes, transverse beams pivotally supported, at their ends, by said equalizers, swinging links carried by said transverse beams, a bolster, and springs arranged between said bolster and said links resiliently to carry the load.

4. In a railroad truck, journal boxes, longitudinal equalizers carried by said journal boxes, transverse beams pivotally supported by said equalizers, a bolster on which the vehicle is mounted, and transverse resilient suspension means between said equalizers and said bolster, including cooperating helical and elliptic springs.

5. A railroad truck comprising a plurality of sets of wheels, journal boxes carried by said wheels, longitudinal equalizers each supported by a pair of journal boxes, transverse beams pivotally supported by said equalizers, spacing means for said wheels independent of the load-carrying means, and resilient means for supporting the load upon said wheels through said equalizers and beams.

6. A railroad truck comprising a plurality of pairs of wheels, longitudinally arranged equalizers carried by said wheels, transverse beams pivotally supported at their ends by said equalizers, a truck frame for spacing said wheels relatively to each other, and a bolster resiliently supported by said beams and arranged to carry the load independently of said truck frame.

7. In a railroad truck, longitudinal equalizers, transverse beams pivotally supported by said equalizers, spring seats supported by said beams and carrying springs, a truck bolster resting upon said springs, a truck frame, and means between said truck frame and said bolster to position said bolster relatively to said truck frame but without supporting said truck frame.

8. A railroad truck comprising a truck frame, car journals positioned in said truck frame, cushioning means for said truck frame, a truck bolster, means for resiliently supporting said bolster on said car journals including longitudinal equalizers, transverse beams pivotally supported by said equalizers, and spacing means interposed between said truck frame and said bolster.

9. A railroad truck comprising a truck frame, car journals positioned in said truck frame, cushioning means for said truck frame, a truck bolster, means for resiliently supporting said bolster on said car journals including longitudinal equalizers, transverse beams pivotally supported by said equalizers, and spacing means interposed between said truck frame and said bolster, including ball ended spacing compression rods.

10. A railroad truck comprising a truck frame, car journals positioned in said truck frame, cushioning means for said truck frame, a truck bolster, means for resiliently supporting said bolster on said car journals including longitudinal equalizers, transverse beams, and spacing means interposed between said truck frame and said bolster, including ball ended spacing compression rods and replaceable shims at the ends of said rods.

11. In a railroad truck, a plurality of pairs of wheels, longitudinal equalizers carried by said wheels, transverse beams pivotally supported by said equalizers, a bolster on which the load is mounted, and resilient suspension means between said equalizers and the load including springs and cooperating swinging links.

12. In a railroad truck, at least two pairs of wheels, springs carried by said wheels, a bolster carried by said springs, and a plurality of compression spacing members arranged before and behind and pivotally connected to said bolster to take the compression thrust thereon.

13. A railroad truck comprising at least two pairs of car wheels, a bolster, longitudinal equalizers, transverse beams pivotally supported by said equalizers, swinging links interposed between said wheels and said bolster, and cooperating elliptic and helical springs for resiliently supporting said bolster.

14. In a railroad truck, at least two pairs of car wheels, a bolster, means resiliently to support said bolster upon said car wheels including elliptic springs and cooperating upper and lower sets of nested helical springs having coils of different diameters and varying in diameter of the wire thereof.

15. In a railroad truck, at least two pairs of wheels, springs carried by said wheels, a bolster carried by said springs, and universally movable pairs of compression ball-ended thrust members arranged before and behind said bolster to take the compression only on said bolster.

16. A railroad truck comprising a truck frame, car journals positioned in said truck frame, cushioning means for said truck frame, a truck bolster, means for resiliently supporting said bolster on said car journals, and fore and aft spacing members arranged between said truck frame and said bolster and pivotally connected to each to take the thrust on said bolster.

17. A railroad truck comprising a truck frame, car journals positioned in said truck frame, cushioning means for said truck frame, a truck bolster, means for resiliently supporting said bolster on said car journals, and universally movable pairs of oppositely disposed ball-ended thrust members arranged between said truck frame and opposite sides of said bolster to take the longitudinal thrust on said bolster.

18. A railroad truck comprising a truck frame, car journals positioned in said truck frame, cushioning means for said truck frame, a truck bolster, means for resiliently supporting said bolster on said car journals, and universally movable ball ended compression thrust members arranged between said truck frame and said bolster to take the longitudinal compression thrust only on said bolster.

19. A railroad truck comprising a truck frame, car journals positioned in said truck frame, cushioning means for said truck frame, a truck bolster, means for resiliently supporting said bolster on said car journals, universally movable thrust members interposed between said truck members and said bolster to take the thrust, and replaceable shims between said thrust members and said truck frame.

20. A railroad truck comprising a truck frame, car journals positioned in said truck frame, cushioning means for said truck frame, a truck bolster, means for resiliently supporting said bolster on said car journals, universally movable thrust members interposed between said truck members and said bolster to take the thrust, an adjustable socket for one end of said thrust member, and replaceable shims between said socket and said frame.

21. A railroad truck comprising a truck frame, car journals positioned in said truck frame, cushioning means for said truck frame, a truck bolster, means for resiliently supporting said bolster on said car journals, universally movable thrust members interposed between said truck members and said bolster to take the thrust, an adjustable socket for one end of said thrust member, and replaceable shims for taking up wear between said thrust member and said socket.

22. In a railroad truck, the combination of at least two pairs of wheels, springs carried by said wheels, a bolster carried by said wheels, a frame, and means to transmit the longitudinal thrust between said frame and said bolster, said means comprising spacing members before and behind said bolster and interposed between said bolster and said frame and flexibly jointed to each to swing vertically, one being arranged to transmit the thrust in one direction and the other to transmit the thrust in the opposite direction.

In testimony whereof, I have signed my name to this specification.

GEORGE F. STARBUCK.